United States Patent [19]
Vogel

[11] 4,060,279
[45] Nov. 29, 1977

[54] PASSENGER SEAT STRUCTURE FOR VEHICLES

[75] Inventor: Ignaz Vogel, Karlsruhe, Germany

[73] Assignee: Ignaz Vogel GmbH und Co. KG-Fahrzeugsitze, Karlsruhe, Germany

[21] Appl. No.: 726,618

[22] Filed: Sept. 27, 1976

[30] Foreign Application Priority Data
Sept. 25, 1975 Germany .................... 2542754

[51] Int. Cl.² ............................................. A47C 1/12
[52] U.S. Cl. .................................... 297/445; 297/451; 297/232
[58] Field of Search ........... 297/232, 449, 445, 450, 297/451, 455

[56] References Cited
U.S. PATENT DOCUMENTS

| | | | |
|---|---|---|---|
| 2,630,158 | 3/1953 | Davis et al. | 297/445 X |
| 3,747,979 | 7/1973 | Barecki | 297/445 X |
| 3,897,974 | 8/1975 | Barecki | 297/232 X |
| 3,899,211 | 8/1975 | Barecki | 297/445 X |

*Primary Examiner*—James C. Mitchell
*Attorney, Agent, or Firm*—Walter Becker

[57] ABSTRACT

A passenger seat structure for vehicles which comprises an underframe having at least one seat with a back fastened thereto. The underframe includes a substantially horizontal supporting member which has only that end thereof which is adjacent one side wall of the vehicle by a support connected to the floor of the vehicle. The horizontal supporting member which may be hairpin-shaped has its individual legs interconnected and has one end of a reinforcement connected to the bottom side of the supporting member while the other end of the reinforcement member is connected to the support which latter is connected to the vehicle floor.

6 Claims, 5 Drawing Figures

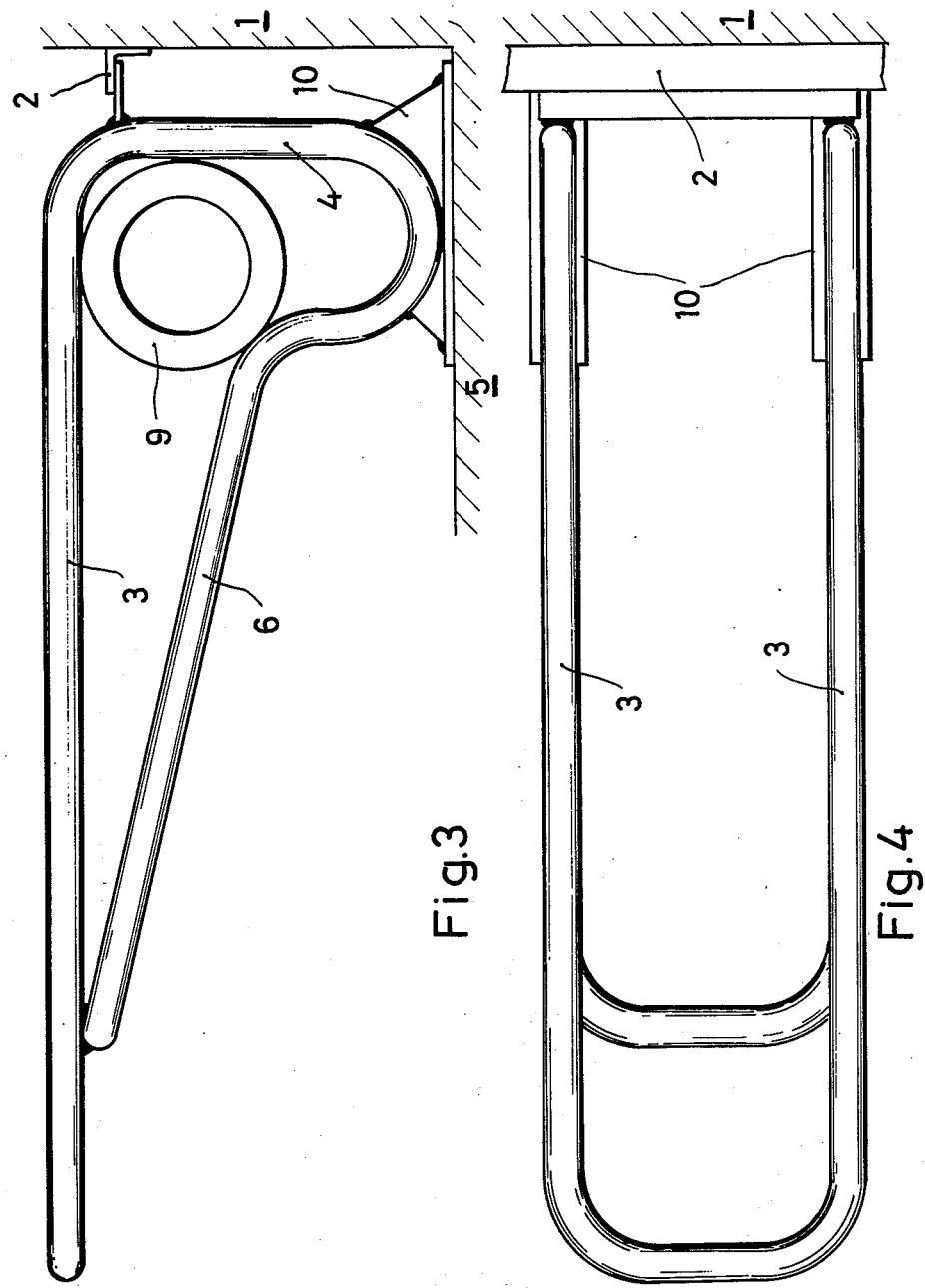

PASSENGER SEAT STRUCTURE FOR VEHICLES

The present invention relates to a passenger seat structure which comprises a seating surface with back rest connected to an underframe which latter in the passenger compartment engages the side wall of the vehicle and is mounted thereon. The underframe comprises a horizontal section which by means of approximately vertical supports is connected to the floor of the respective vehicle and, if desired, is arranged on a connecting rail which extends along the side wall of the vehicle.

Passenger seats of this type are used in various kinds of vehicles, such as buses, railway cars, airplanes and ships. With the first mentioned vehicles and partly also with ships the passenger compartment is so designed that the passenger seats engage both side walls of the vehicle and can thus be reached only from a center aisle. This results in a special construction of the passenger seats according to which the above mentioned horizontal section is at the side of the aisle resting on the vehicle floor by means of about vertically extending supports while at the side next to the side wall of the vehicle it is resting on a supporting rail connected to the respective side wall.

Passenger seats do not only have to provide a seating possibility for the passengers but they must also afford a protection in case of accidents. To this end, the passenger seats are in driving direction designed relatively stiff so that they are able to withstand a certain impact, caused for instance by the passenger in case of an accident. Moreover, the passenger seat constructions are generally so strong that they will have a long useful life span in conformity with the life span of the vehicle, regardless of the unavoidable vibrations and shocks occurring in such vehicles. Therefore, passenger seats of the described type are always made very strong so that they will be able to withstand loads in vertical as well as in horizontal direction.

A soiling of the passenger compartments is unavoidable when transporting passengers. The compartments, therefore, have to be cleaned regularly, which means that not only larger pieces of waste material, such as pieces of paper, have to be picked up but that the floor of the vehicle has from time to time to be wet cleaned with disinfectants. This cleaning, however, is made rather difficult in view of the heretofore known customary passenger seat constructions. More specifically, the cleaning is made difficult not only by the fact that the supporting structures extend rather close to the floor and thus leave only a relatively small space between the underside of the seat structure and the floor of the vehicle, but this difficulty is in particular caused by the arrangement of the supports for the seats at the side of the aisle. Because of these difficulties, the necessary cleaning is not only often omitted, but when a cleaning is carried out it is not done as thoroughly as would be desirable. In this connection it should be borne in mind that time and cost saving cleaning devices cannot be used for the just mentioned reasons but that only manually operable cleaning devices can be used.

It is, therefore, an object of the present invention to provide a passenger seat construction of the above mentioned general character which, while meetng the requirements with regard to strength and life span of the seats, will permit an easy cleaning of the vehicle floor, especially while using vacuum cleaners or the like.

This object and other objects and advantages of the invention will appear more clearly from the following specification in connection with the accompanying drawings, in which:

FIG. 3 illustrates the side view of a further embodiment of the underframe for vehicle seats in conformity with the invention.

FIG. 4 is a top view of FIG. 3.

The passenger seat construction according to the present invention is characterized primarily in that the underframe includes only one supporting leg which is provided on that side of the seat which is next to the side wall of the respective vehicle.

Figure 1:
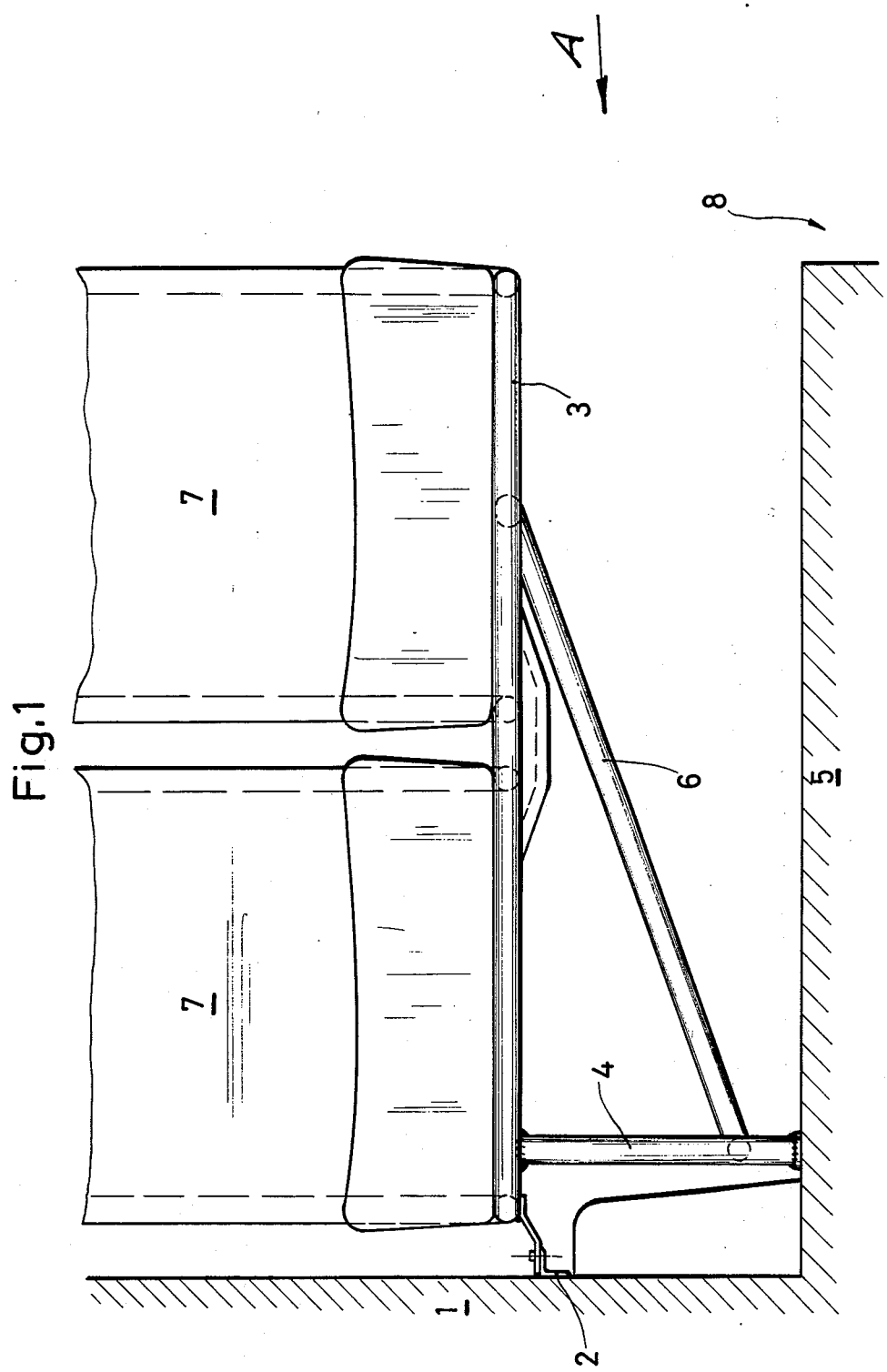
FIG. 1 represents a diagrammatic front view of two passenger seats according to the invention.
Figure 2:
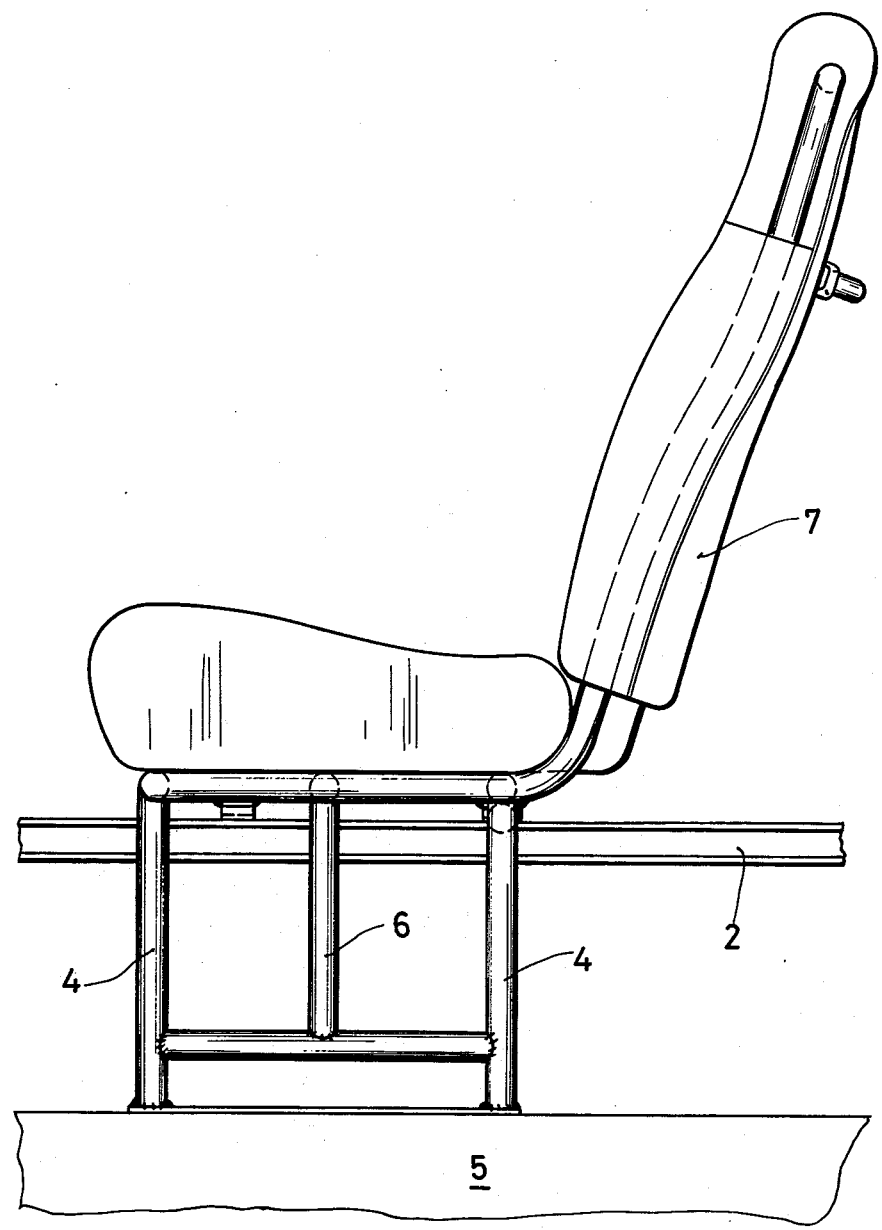
FIG. 2 represents a side view of FIG. 1 as seen in the direction of the arrow A of FIG. 1.

Referring now to the drawings in detail, it will be seen from FIGS. 1 and 2 that a connecting rail 2 is provided on the side wall 1 of a vehicle. Connected to the connecting rail 2 is the supporting means 3 of an underframe which comprises a supporting leg 4 by means of which the underframe rests on the floor of the vehicle. The supporting means 3 of the underframe is reinforced relative to the supporting leg 4 by a strut 6. The passenger seats 7 are resting on the supporting means 3.

As will further be seen from the drawing, especially FIG. 1, the space below the seats 7 and, more specifically, below the underframe 3, 4 is free so that a cleaning of the floor does not encounter any difficulties. Special cleaning machines can also be placed in the aisle 8 for cleaning the floor of the vehicle on both sides of the aisle in a cost saving manner.

FIGS. 3 and 4 illustrate another embodiment of the frame construction according to the invention. Also in this instance connecting rails 2 are provided on the side wall 1 of the vehicle while the underframe for the vehicle seats is connected to the rail 2. The underframe according to FIGS. 3 and 4 consists of a one-piece frame made of tubular material and comprising a supporting section 3, a supporting leg 4 and a reinforcing part 6; accordingly, in effect, first, second and third sections form at least one single integral structural element for the seat structure. In addition thereto, a reinforcing ring 9 is inserted in the tubular frame. This underframe rests on a foot 10 which together with the parts located directly thereabove can be covered up or veneered in any convenient manner.

Figure 5:
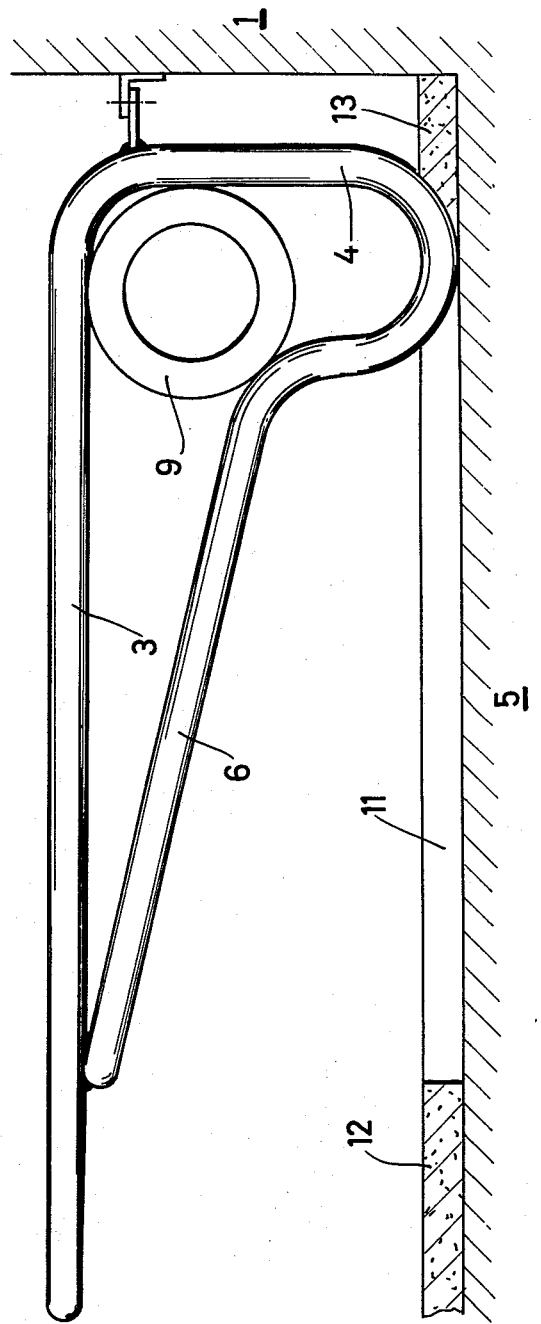
FIG. 5 is a view similar to that of FIG. 3 but differing therefrom in the manner in which the underframe is connected to the floor of the vehicle.

FIG. 5 shows a vehicle seat construction with supporting elements 11 serving as supporting means and extending substantially horizontally. The spaces between the supporting elements or legs 11 are filled-in by form pieces 12, 13.

As will be seen from the above, in contrast to heretofore known seat constructions, the supporting means for the underframe according to the invention are no longer at the side of the aisle resting on supporting legs mounted on the floor of the vehicle but only that part of the supporting means which is located at the side wall of the vehicle is directly supported on the floor. Thus, the supporting means for the understructure project from the side wall in the manner of a cantilever, so that the access to the vehicle floor underneath the seats will be free. This eliminates the difficulties heretofore encountered when cleaning the floors of vehicles equipped with heretofore known seat constructions. The arrangement according to the present invention furthermore creates additional leg space for the passengers. Furthermore the construction according to the present invention permits the use of customary automatic cleaning devices as well as the use of special cleaning devices which can be used with vehicles of similar type.

The supporting means at the side wall of the vehicle may be designed at the designer's discretion. It must only be assured that shocks in horizontal as well as in vertical direction will be absorbed without permanent deformation of the supporting means. This requirement can easily be met by the underframe construction according to the invention. However, the connecting rail on the side wall of the vehicle has in this instance to be designed in such a way that it will also be able to withstand relatively high pulling stresses. If this should not be possible in view of the special construction of the vehicle body or in case existing vehicles with heretofore known seat constructions are to be equipped with the seat construction according to the present invention, it is suggested according to a further feature of the invention to design the underframe in the form of a hairpin while the individual legs are formed as one piece with the supporting means, the support and an additional supporting element extending below the supporting means. The supporting element may be formed by a tubular frame as well as by a supporting plate. The length of the supporting element depends on the loadability of the connecting rail inasmuch as the possibly remaining pitching moment must be absorbed by the connecting rail. the width of the supporting element, in other words its extension in driving direction, has to meet the above described requirements, i. e. it must be so wide that a tipping over of the seat will be avoided even when the seat is subjected to considerable loads in driving direction.

The design of the entire underframe is again at the discretion of the designer. The construction must merely be such that it meets the valid rules of statics and that the purpose of the present invention, namely the free access to the space below the seats, will be assured. The support for the underframe may be embedded in the vehicle floor, or form pieces may be inserted between the supporting elements in order to assure a flush upper surface and thus the desired easy cleaning possibility.

It is, of course, to be understood that the present invention is by no means limited to the specific showing in the drawings but also comprises any modifications within the scope of the appended claims.

What I claim is:

1. A passenger seat underframe structure for a vehicle having side walls and a floor, which includes in combination: a frame comprising a first section for receiving and supporting at least one seat with a back, a second section having one end connected to that one end portion of said first section which is to be placed near one side wall of the vehicle to be equipped with said seat structure, said second section having its other end arranged for connection directly with only the vehicle floor, and a third section forming reinforcing means having opposite end portions respectively connected to said first and second sections so as to form a cantilever triangle-shaped structure therewith.

2. A seat underframe structure in combination according to claim 1, in which said second section forms a substantially right angle with said first section.

3. A seat underframe structure in combination according to claim 1, in which one end of said third section is connected to said second section at a level spaced from that end of said second section which is remote from said first section.

4. A seat underframe structure in combination according to claim 1, in which that one end portion of said first section which is to be placed near one side wall of the vehicle to be equipped with said seat structure is provided with a separate connecting means for connecting said frame to said last-mentioned side wall.

5. A seat underframe structure in combination according to claim 1, in which each of said first and second and third sections has a U-shaped contour and respectively forms tubular elements.

6. A seat underframe structure in combination according to claim 1, in which said first and second and third sections form at least one single integral structural element independently for said seat structure.

* * * * *